US008963458B2

(12) United States Patent
Muto et al.

(10) Patent No.: US 8,963,458 B2
(45) Date of Patent: Feb. 24, 2015

(54) RECHARGEABLE ELECTRIC TOOL AND METHOD FOR MANUFACTURING RECHARGEABLE ELECTRIC TOOL

(75) Inventors: Motoharu Muto, Mie (JP); Masamichi Nakamura, Shiga (JP); Masaki Ikeda, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 112 days.

(21) Appl. No.: 13/825,251

(22) PCT Filed: Sep. 12, 2011

(86) PCT No.: PCT/JP2011/070686
§ 371 (c)(1),
(2), (4) Date: Mar. 20, 2013

(87) PCT Pub. No.: WO2012/043204
PCT Pub. Date: Apr. 5, 2012

(65) Prior Publication Data
US 2013/0193881 A1    Aug. 1, 2013

(30) Foreign Application Priority Data
Sep. 27, 2010    (JP) .................................. 2010-216191

(51) Int. Cl.
*H02P 1/00*    (2006.01)
(52) U.S. Cl.
USPC ........... 318/139; 318/280; 318/430; 318/434; 388/937
(58) Field of Classification Search
USPC .................... 318/139, 430, 434, 280; 388/937
See application file for complete search history.

(56) References Cited

U.S. PATENT DOCUMENTS

| 7,728,553 B2 * | 6/2010 | Carrier et al. | 320/119 |
| 7,777,440 B2 * | 8/2010 | Nagai | 318/434 |
| 7,928,692 B2 * | 4/2011 | Carrier et al. | 320/119 |
| 7,940,017 B2 * | 5/2011 | Takemasa | 318/280 |

(Continued)

FOREIGN PATENT DOCUMENTS

| JP | 3268086 B2 | 3/2002 |
| JP | 2008-132551 A | 6/2008 |

(Continued)

OTHER PUBLICATIONS

International Search Report for corresponding International Application No. PCT/JP2011/070686 mailed Oct. 11, 2011.

(Continued)

*Primary Examiner* — Paul Ip
(74) *Attorney, Agent, or Firm* — Renner, Otto, Boisselle & Sklar, LLP

(57) ABSTRACT

The electric tool is powered by a secondary battery as a power source, and includes: an output section configured to be transmitted thereto a rotation of a motor directly or through a decelerator; a voltage measurement section that measures a battery voltage; a storage means that stores, as a reference voltage, a voltage value of the battery voltage measured preliminarily when a motor-lock is occurring; and a control means that controls a driving of the motor. The control means is configured to decide that the motor is being locked and then stop or decelerate the motor upon detecting that the battery voltage measured through the voltage measurement section is maintained lower than or equal to the reference voltage stored in the storage means for a predetermined period of time during the driving of the motor.

17 Claims, 5 Drawing Sheets

(56) References Cited

U.S. PATENT DOCUMENTS

| | | | |
|---|---|---|---|
| 8,179,069 B2 | 5/2012 | Matsunaga et al. | |
| 8,324,845 B2* | 12/2012 | Suzuki et al. | 318/139 |
| 8,476,862 B2* | 7/2013 | Matsumoto | 318/800 |
| 2005/0007799 A1* | 1/2005 | Schreiber et al. | 363/132 |
| 2007/0024218 A1* | 2/2007 | Nagai | 318/109 |
| 2008/0238370 A1* | 10/2008 | Carrier et al. | 320/134 |
| 2008/0315815 A1* | 12/2008 | Serizawa et al. | 318/453 |
| 2009/0051306 A1 | 2/2009 | Matsunaga et al. | |
| 2009/0058332 A1* | 3/2009 | Takemasa | 318/287 |
| 2009/0295313 A1* | 12/2009 | Suzuki et al. | 318/139 |
| 2010/0213900 A1* | 8/2010 | Carrier et al. | 320/134 |
| 2011/0026172 A1* | 2/2011 | Matsumoto | 361/31 |
| 2011/0163701 A1* | 7/2011 | Carrier et al. | 318/139 |

FOREIGN PATENT DOCUMENTS

| | | |
|---|---|---|
| JP | 2009-050932 A | 3/2009 |
| JP | 2009-285805 A | 12/2009 |
| JP | 2010-082761 A | 4/2010 |

OTHER PUBLICATIONS

PCT/ISA/237 for corresponding International Application No. PCT/JP2011/070686 dated Oct. 11, 2011.

* cited by examiner

RECHARGEABLE ELECTRIC TOOL AND METHOD FOR MANUFACTURING RECHARGEABLE ELECTRIC TOOL

TECHNICAL FIELD

The invention relates to an electric tool powered by a secondary battery, and a method for manufacturing the electric tool.

BACKGROUND ART

As is well known, an electric tool such as a drill-driver sometimes causes that the output shaft thereof is locked up while using the tool. At this time, the motor as a drive source thereof is also locked up (motor-lock). The motor does not rotate during the motor-lock. Therefore, temperature of the winding wire of the motor increases if the motor-lock continues, and the motor may be caused a thermal damage. In this case, the performance of the motor may be seriously deteriorated.

Therefore, it has been demanded to detect as soon as possible the occurrence of the motor-lock in order to decelerate the motor or stop the supply of electric current.

The occurrence of the motor-lock can be detected, for example, by monitoring the rotary speed of the motor, measuring the motor current, or measuring the temperature of the motor. However, these configurations require additional sensors. Incidentally, it has been known that the voltage of the battery decreases during the motor-lock because large electric current flows, and therefore the motor-lock can be detected by utilizing this characteristics. Herein, the electric tool that is powered by a secondary battery of a lithium-ion battery is generally configured to stop the supply of the electric current to the motor when the battery voltage drops to a certain voltage (hereinafter, referred to as "overdischarge protection voltage"), in order to prevent an overdischarge of the lithium-ion battery. The occurrence of the motor-lock can be prevented by this configuration. That is, when the battery voltage drops to the overdischarge protection voltage due to the voltage drop caused by the motor-lock, the electric tool stops supplying the electric current to the motor. Therefore, this "overdischarge protection function" may serve for preventing the continuation of the motor-lock.

As for an electric tool that is provided with a comparatively large motor, a large electric current of 100 [A] or more flows during the motor-lock. In this case, the battery voltage drops to reach the overdischarge protection voltage during the motor-lock. On the contrary, as for an electric tool that is provided with a comparatively small motor, the electric current that flows during the motor-lock is several tens of amperes, and therefore the battery voltage may not reach the overdischarge protection voltage even when the motor-lock occurs. In this case, the motor cannot be protected.

Incidentally, Japan patent document 3268086 B discloses a protection circuit that includes a comparator and that is configured to detect the occurrence of the motor-lock based on an amount of voltage drop within a predetermined period of time. This circuit can detect the occurrence of the motor-lock if the battery voltage changes rapidly. However, this circuit cannot detect the occurrence of the motor-lock if the battery voltage changes slowly as in a case of tightening a wood screw having a large diameter and a long length, or a case of boring a hole of a large diameter.

DISCLOSURE OF INVENTION

The present invention is developed in view of above problem. An object of the present invention is to provide an electric tool that can reliably detect the occurrence of the motor-lock and can prevent the damage of the motor without adding a sensor and/or a circuit, and to provide a method for manufacturing the electric tool.

An electric tool of the present invention powered by a secondary battery as a power source comprises: an output section configured to be transmitted thereto a rotation of a motor directly or through a decelerator; a voltage measurement section configured to measure a battery voltage; a storage means configured to store, as a reference voltage, a voltage value of the battery voltage measured preliminarily at that time a motor-lock is occurring; and a control means configured to control a driving of said motor, wherein said control means is configured to decide that said motor is in a locked state and then stop or decelerate said motor when the battery voltage measured through said voltage measurement section is maintained lower than or equal to the reference voltage stored in said storage means for a predetermined period of time during the driving of said motor. The electric tool judges whether or not the motor-lock occurs by comparing the battery voltage measured when the motor is rotated and the battery voltage measured when the motor was locked.

Preferably, the reference voltage stored in said storage means is a voltage value of the battery voltage obtained at that time said motor is in a locked state under a condition where the environmental temperature is a maximum value within a temperature range supposed for using the electric tool.

Preferably, the electric tool further comprises a temperature sensor for measuring a temperature, wherein said control means is configured to change the reference voltage that is compared with the battery voltage during the driving of said motor, on the basis of the temperature measured through said temperature sensor.

Preferably, the reference voltage stored in said storage means is a voltage value of the battery voltage obtained at that time said motor is in a locked state under a condition where said secondary battery is fully charged.

Preferably, said control means is configured to change the reference voltage that is compared with the battery voltage during the driving of said motor, on the basis of a battery level measured before said motor is driven.

Preferably, the electric tool further comprises a rewriting means for rewriting the reference voltage stored in said storage means.

Preferably, the reference voltage is set higher than or equal to a threshold value used for preventing an overdischarge of said power source.

A method of the present invention for manufacturing an electric tool powered by a secondary battery is directed for manufacturing an electric tool that comprises: an output section configured to be transmitted thereto a rotation of a motor directly or through a decelerator; a voltage measurement section configured to measure a battery voltage; a storage means configured to store a reference voltage; and a control means configured to control a driving of said motor, wherein said control means is configured to decide that said motor is in a locked state and then stop or decelerate said motor when the battery voltage measured through said voltage measurement section is maintained lower than or equal to the reference voltage stored in said storage means for a predetermined period of time during the driving of said motor, and wherein the method comprises steps of: a measurement step of measuring a voltage value of the battery voltage when said motor is in a locked state; and a storage step of memorizing on said storage means, as the reference voltage, said voltage value of the battery voltage measured when said motor is in the locked state.

Preferably, said measurement step is performed under a condition where the environmental temperature is a maximum value within a temperature range supposed for using the electric tool.

Preferably, said measurement step includes a plurality of measurement steps, said plurality of measurement steps being performed under conditions where environmental temperatures are different from one another, and in said storage step, voltage values of the battery voltage obtained in the plurality of measurement steps each are memorized in said storage means, as the reference voltage, in associated with the corresponding environmental temperature.

Preferably, said measurement step is performed under a condition where said secondary battery is fully charged.

Preferably, said measurement step includes a plurality of measurement steps, said plurality of measurement steps being performed under conditions where battery levels before the measurements are different from one another, and in said storage step, voltage values of the battery voltage obtained in the plurality of measurement steps each are memorized in said storage means, as said reference voltage, in associated with the corresponding battery level before the measurement.

Preferably, said electric tool further comprises a rewriting means for rewriting the reference voltage stored in said storage means.

Preferably, said measurement step includes a plurality of measurement steps, said plurality of measurement steps being performed using a plurality of electric tools that have the same configuration with one another, thereby obtaining the voltage values of the battery voltage when said motors are in locked states with regard to said plurality of electric tools, and in said storage step, the reference voltage is determined based on the voltage values obtained with regard to said plurality of electric tools, and then is stored.

The present invention is configured to judge the occurrence of the motor-lock by comparing a voltage value of a battery voltage measured at that time the motor is in a locked state and a voltage value of the operation of the motor. The present invention therefore can reliably detect the occurrence of the motor-lock not only in a case where the battery voltage changes rapidly but also in a case where the battery voltage changes slowly.

BEST MODE FOR CARRYING OUT THE INVENTION

Figure 2:
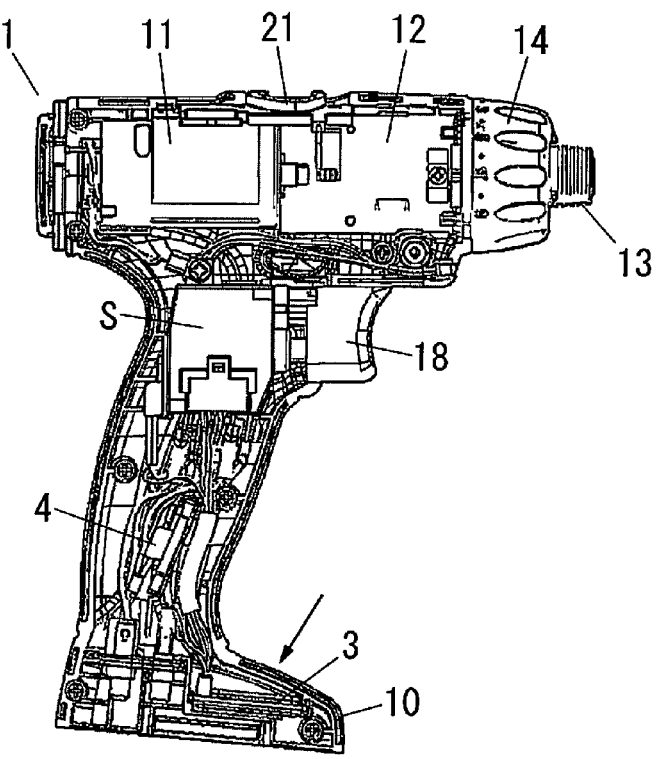
FIG. 2 is a side view of the embodiment a part of which is detached.
Figure 3:
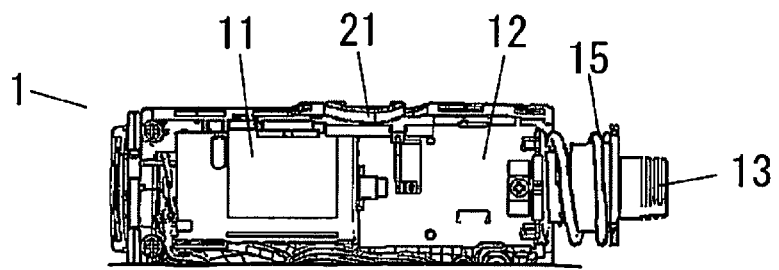
FIG. 3 is a side view of the embodiment a part of which is omitted under a condition where a clutch handle is detached.

An embodiment of the present invention is explained below. FIGS. 2 and 3 show a structural example of the embodiment. An electric tool 1 of the embodiment shown in the figure is a drill-driver having a drill-mode and a driver-mode which can be selected freely. The electric tool 1 includes a grip portion 10. A battery pack 2 that includes a lithium-ion battery is detachably connected to a lower end of the grip portion 10. As shown in FIGS. 2, 3, the electric tool 1 includes a motor 11, a decelerator 12, a selector switch 21, a bit-holder (output section) 13, a clutch-handle 14, a clutch spring 15, a trigger 18, and a pack connection section.

In the embodiment, rotation of the motor 11 is transmitted to the bit-holder 13 through the decelerator 12. The decelerator 12 is configured so that the reduction ratio thereof is changed through an operation of the selector switch (reduction ratio selector switch) 21. The decelerator 12 includes a built-in clutch that is configured to change a tightening torque by adjusting a length of the clutch spring 15 in an axial direction in response to an operation of the clutch-handle 14. In the driver-mode, the clutch is activated. In the drill-mode, the clutch is not activated and the bit-holder 13 is kept connected directly to the decelerator 12 even when a load torque increases. The electric tool 1 may be configured so that the rotation of the motor 11 is directly transmitted to the bit-holder 13.

Figure 1:
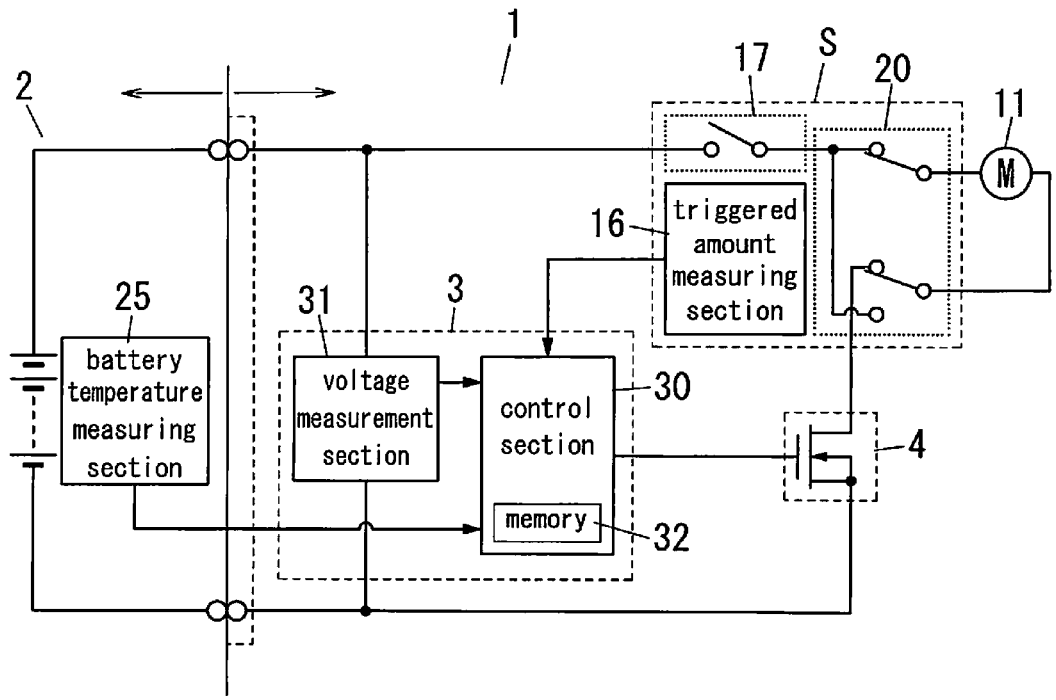
FIG. 1 is a block diagram of an electric tool according to an embodiment of the present invention.

The battery pack 2 is detachably attached to the pack connection section that is formed, for example, at the lower end of the grip portion 10. As shown in FIG. 1, the battery pack 2 includes a battery temperature measuring section 25 for measuring the temperature of the battery.

The electric tool 1 has a built-in switch block S that is provided at a basal part of the grip portion 10. As shown in FIG. 1, the switch block S includes a triggered amount measuring section 16, a main contacts 17 and a contact section 20. The triggered amount measuring section 16 is configured to measure a pulled amount of the trigger 18. The main contacts 17 is configured to make a connection between the motor 11 and a battery when the trigger 18 is pulled. The contact section 20 is configured to change the direction of the rotation of the motor 11 by switching the polarity of the connection between the motor 11 and the battery in response to an operation of the selector switch 21.

The electric tool 1 includes a switching element 4 and a control circuit 3 configured to control the driving of the motor 11 via the switching element 4 based on PWM control signal. As shown in FIG. 1, the control circuit 3 includes a control section (control means) 30 for controlling the switching element 4 and a battery voltage measurement section (voltage measurement section) 31 for measuring the battery voltage. The battery voltage measurement section 31 is configured, for example, to measure the voltage of the battery pack 2 that is connected to the pack connection section.

In the present embodiment, the battery voltage measurement section 31 is included in the electric tool 1. This configuration is enabled to simplify the structure of the battery pack 2 compared with a case where a battery voltage measurement section is included in the battery pack 2.

The control section 30 is configured to control the driving of the motor 11 via the switching element 4 based on the information sent from the triggered amount measuring section 16 and that sent from the battery voltage measurement section 31. The control section 30 may be configured to turn off the switching element 4 to stop (or reduce the speed of) the rotation of the motor 11 when the control section 30 receives the information that the temperature of the battery pack 2 has increased from the battery temperature measuring section 25 (that includes a thermistor) of the battery pack 2.

When the battery pack 2 is connected to the electric tool 1 and the main contact 17 and the switching element 4 are closed to form a closed circuit, an electric current flows through the motor 11 by an electromotive force of the battery pack 2, and then the motor 11 starts to rotate. In this time, the motor 11 generates a back electromotive force that is proportional to the rotation speed of the motor 11. During the rotation of the motor 11, the electromotive force of the battery pack 2 matches with a sum of the back electromotive force of the motor 11, a voltage drop due to an internal resistance of the electric tool 1, and a voltage drop due to an internal resistance of the battery pack 2.

If the motor 11 is loaded when the motor 11 is driven, the rotation speed of the motor 11 decreases, and therefore the back electromotive force generated by the motor 11 decreases. In contrast, the electromotive force of the battery pack 2 does not change instantly. As a result, the electric current flowing through the closed circuit increases, and the voltage drop due to the internal resistance of the battery pack 2 increases. Accordingly, the battery voltage of the battery pack 2 (battery voltage measured through the battery voltage measurement section 31) in this state is smaller than that in a state where the motor 11 is not loaded. Note that, the battery voltage of the battery pack 2 measured through the battery voltage measurement section 31 decreases with the increase of the load on the motor 11.

Figure 4:
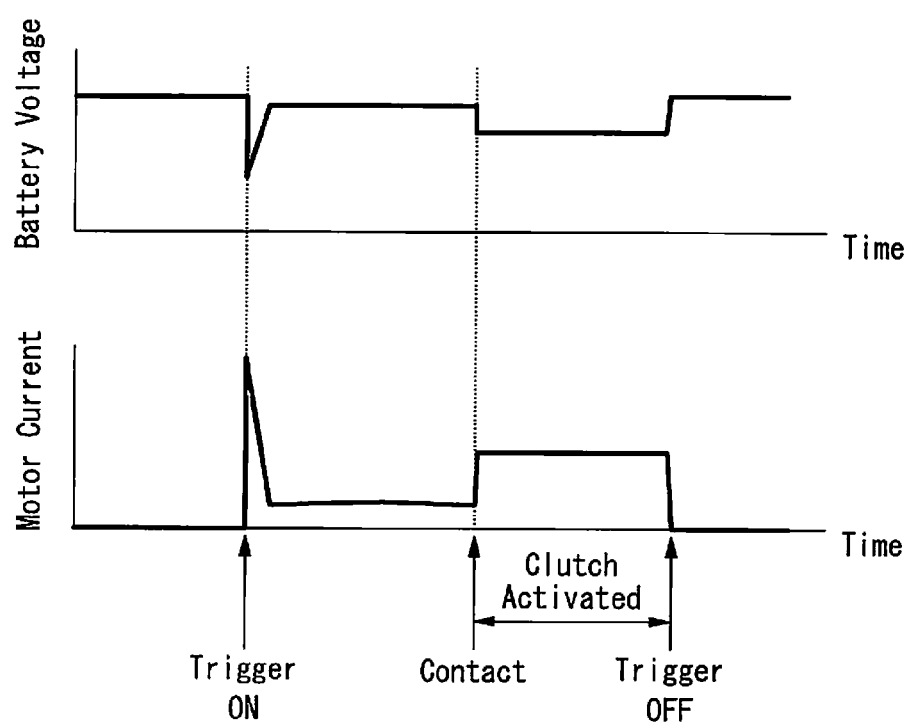
FIG. 4 is a time chart showing time changes of a battery voltage and a motor current in a normal operation of an electric tool.
Figure 5:
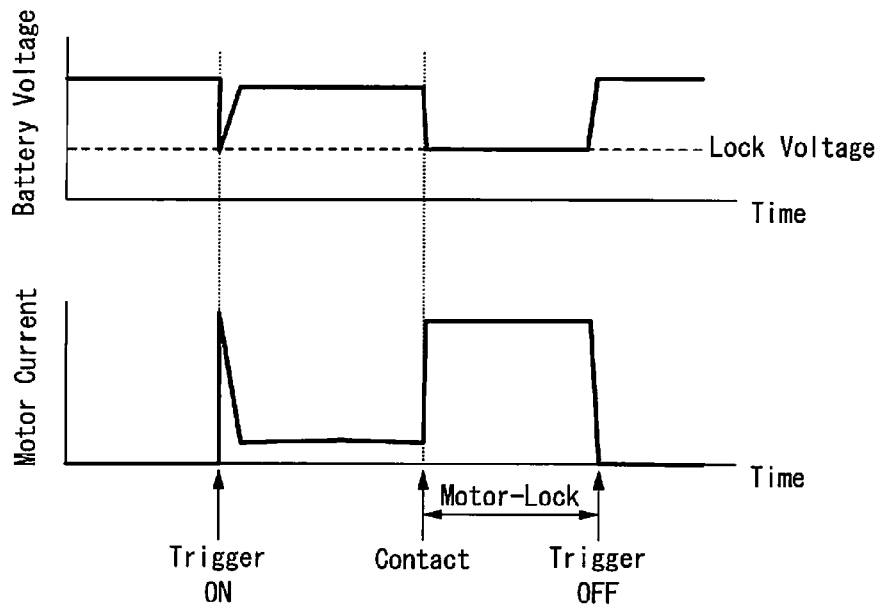
FIG. 5 is a time chart showing time changes of the battery voltage and the motor current, of a case where the electric tool is caused a motor-lock during the operation.
Figure 6:
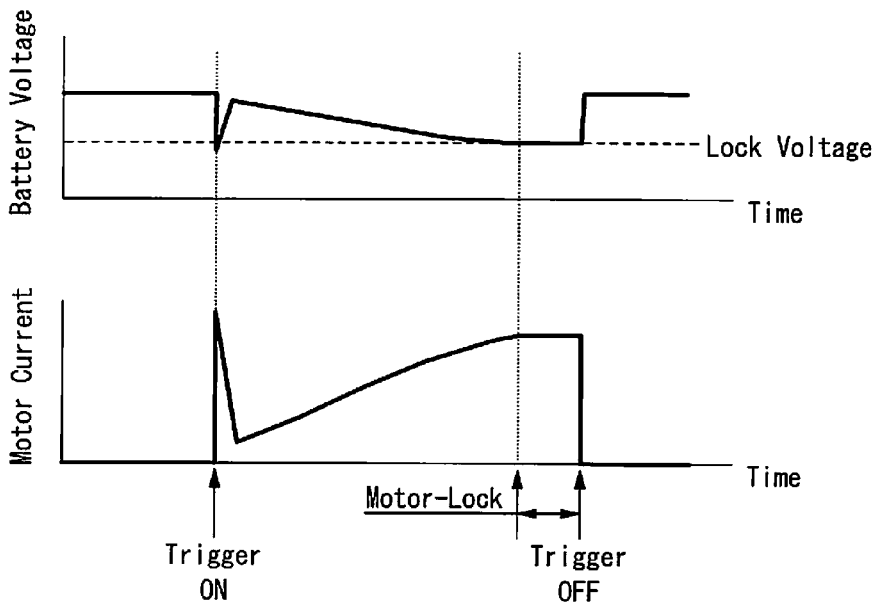
FIG. 6 is a time chart showing time changes of the battery voltage and the motor current, of a case where the electric tool is caused a motor-lock of another type during the operation.

FIGS. 4 to 6 each are a time chart showing time changes of a battery voltage and a motor current of a typical electric tool after pulling a trigger. FIG. 4 is a time chart that illustrates the changes of the battery voltage and the motor current under a condition where a screw is tightened into a screw hole formed at a metal material by use of the electric tool that is set to the driver-mode. As shown in FIG. 4, when a switching element is turned on by pulling the trigger, a starting current for starting the rotation of the motor flows first, and after that the motor current changes depending on an amount of an applied load on the motor. In this case, because the screw hole is formed preliminarily, the load is comparatively small and the electric current is comparatively small. As is seen from the figure, the load increases sharply when a head of the screw comes in contact with the metal material. In this case, the clutch is activated to separate the bit-holder from the motor when an amount of the load reaches the tightening torque that is preset in the clutch, and the motor current is kept at a certain value after the clutch is activated.

In this condition however, if the reduction ratio of the decelerator is set at a comparatively small value, it may occur that the load torque becomes larger than an output torque while that the output torque becomes smaller than the tightening torque of the clutch. In this case, the electric tool is caused the motor-lock. In a condition where the electric tool is set to the drill-mode, the electric tool is caused the motor lock when the load torque becomes larger than the output torque.

In a case where a screw is tightened into a screw hole formed at a plate by use of the electric tool that is set to the drill-mode, the electric tool may be caused the motor-lock because the clutch is not worked. FIG. 5 is a time chart of this case that illustrates the changes of the battery voltage and the motor current. The motor stops rotating during the motor-lock. Therefore, the electric tool may be regarded as a condition where the battery is connected between terminals of a coil (i.e. resistor). Accordingly, the electric current is kept at a certain value during the motor-lock.

FIG. 6 is a time chart that illustrates the changes of the battery voltage and the motor current under a condition where a long wood screw is tightened to a wood material by use of the electric tool that is set to the drill-mode. As is seen from the figure, the electric tool is always subjected to a load because the electric tool digs to make a screw hole. Also, since the inserted portion of the screw increases as the screw tightening progresses, the load on the motor increases gradually. And then, the electric tool is caused the motor-lock when the load torque becomes larger than the output torque. In this case, the battery voltage changes slowly until the electric tool is caused the motor-lock.

In the present invention, a voltage value of the battery voltage when the motor-lock is occurring (hereinafter referred to as "lock-voltage"; see FIGS. 5, 6) is measured preliminarily, and the value is stored in a memory (storage means) 32 in the control section 30 of a microcomputer, as a reference voltage. The control section 30 is configured to use the reference voltage as a threshold value, and is configured to decide that the motor 11 is in a locked state and to turn off the switching element 4 when the battery voltage, during the driving of the motor 11, decreases to the threshold value. Note that, the control section 30 is configured to turn off the switching element 4 only when the battery voltage is maintained lower than or equal to the threshold value (lock-voltage) for a predetermined period of time so that the control section 30 will not stop the motor when the battery voltage decreases to the threshold value due to the voltage drop caused of the starting current.

In the electric tool 1 of the present embodiment, the voltage value of the battery voltage (lock-voltage) obtained when the motor 11 is in a locked state is stored in the memory 32 as the reference voltage. The voltage value of the battery voltage when motor 11 is in a locked stare is a value that has been measured preliminarily. The control section 30 is configured to make a decision of occurrence of the motor-lock only when the battery voltage (voltage of the battery pack 2) measured through the battery voltage measurement section 31 is maintained lower than or equal to the reference voltage for the predetermined period of time. With this configuration, the control section 30 can reliably detect the occurrence of the lock of the motor 11. When deciding that the motor 11 is in a locked state, the control section 30 turns off the switching element 4 to stop the driving of the motor 11.

According to the above mentioned configuration for detecting the motor-lock, it can detect the occurrence of the motor-lock by means of the voltage measurement section that is provided for preventing the overdischarge of the battery pack, without adding another sensor (such as a sensor for monitoring the rotation speed of the motor, a sensor for measuring the motor current, or a sensor for measuring the temperature of the motor). The control section 30 of the present embodiment is configured to decide that the motor-lock occurs and then turns off the switching element 4, based on a detection that the battery voltage measured through the battery voltage measurement section 31 becomes lower than or equal to the threshold value (reference voltage). This configuration can reliably detect the motor-lock even when the voltage changes slowly. The present embodiment therefore enables to prevent the damage of the motor caused by the continuation of the motor-lock.

In the above example, the motor is stopped upon detection of the motor-lock, but the present embodiment is not limited to such a configuration. For example, the electric tool may be configured to gradually reduce the on-duty of the PWM control signal of the switching element 4. This configuration can achieve similar effect with the above configuration of stopping the motor.

In the above example, the switching element 4 is turned off when the battery voltage becomes lower than or equal to the lock-voltage, but the present embodiment is not limited to such a configuration. For example, in consideration of the variability in components and detection variability of the control circuit, the switching element 4 may be turned off when the battery voltage becomes lower than the lock-voltage, or the threshold value may be defined by adding a certain value to the lock-voltage in light of the variability. In other words, the reference voltage that is stored in the memory 32 may be a value defined by adding a certain value to the voltage value of the battery voltage (lock-voltage) obtained when the motor-lock occurs. The control section 30 may be configured to use, as the threshold value for detecting the motor-lock, a value obtained by adding a certain value to the reference voltage stored in the memory.

It is noted that the lock-voltage varies depending on a battery voltage before the rotation (driving) of the motor 11. If the battery voltage before the rotation is low, the lock-voltage becomes small. In view of this, it is preferred to perform the measurement of the lock-voltage in under a condition where the electric tool is connected to the battery pack 2 that is fully charged (i.e. voltage before the rotation is maximum), and to store the obtained value on the memory 32 as the reference voltage. In other words, the reference voltage stored in the memory 32 is preferably a voltage value of the battery voltage obtained at that time the motor 11 is in a locked state under a condition where the secondary battery of the battery pack 2 is fully charged. This configuration enables not to be affected by the change of the battery voltage caused by the change of the remaining battery level.

It is also noted that the lock-voltage varies depending on a temperature of the battery, because the voltage drop during the motor-lock of the battery is related to the internal resistance of the battery. If an electric tool, which stores in the memory 32 the lock-voltage that was measured at a normal temperature as the reference voltage and is configured to use the reference voltage for the threshold value of the control section 30, is driven in a hot environment, it may occur that the battery voltage does not drops to the threshold value (lock-voltage) even when the motor 11 is locked. In this case, the motor 11 may be damaged at worst. In view of this, it is preferred that the memory 32 stores the lock-voltage that is measured at a possible highest environmental temperature (e.g. 40 degrees C.) as the reference voltage. That is, it is preferred that the reference voltage stored in the memory 32 is a voltage value of the battery voltage obtained at that time the motor 11 is in a locked state under a condition where the environmental temperature is a maximum value within a temperature range supposed for using the electric tool. This configuration enables to protect the motor from being damaged caused by the motor-lock as long as the electric tool is used in a supposed temperature range (e.g. 0 to 40 degrees C.).

By the way, when the reference voltage is determined based on the above explanations, the electric tool is to use a higher value as the threshold value than a value at which the motor actually is caused the motor-lock, if the temperature of the battery is low and/or the battery voltage before the driving of the motor is low. Therefore, this configuration may reduce the throughput (quantity of work or work-load) of the electric tool.

In view of this, it is preferred to measure the lock-voltages at a plurality of temperature conditions, to produce a data table in which the temperatures and the respective lock-voltages (reference voltages) are associated with, and to store the data table in the memory 32 of the control section 30. In this configuration, the control section 30 retrieves the reference voltage that is associated with a temperature measured at the battery temperature measuring section (temperature sensor) 25 from the data table stored in the memory 32, and uses the obtained reference voltage as the threshold value for detecting the motor-lock, during the rotation of the motor 11. That is, the control section 30 can be configured to change the reference voltage that is compared with the battery voltage during the driving of the motor 11, on the basis of the temperature measured through the battery temperature measuring section 25. In this configuration, the threshold value decreases with the decrease of the temperature, and therefore this configuration enables to avoid an improper judgment of deciding the motor-lock in spite of that the motor is not locked yet. As a result, this configuration enables to increase the throughput (quantity of work).

The similar can be said for the battery voltage before the rotation. That is, it is preferred to measure the lock-voltages with regard to a plurality of battery voltages before the rotation, to produce a data table in which the battery voltage before the rotation and the respective lock-voltages (reference voltages) are associated with, and to store the data table in the control section 30. That is, the control section 30 can be configured to change the reference voltage that is compared with the battery voltage during the driving of the motor, on the basis of a battery voltage of the battery pack 2 before the motor is driven. This configuration uses the threshold value that is related to the actual battery voltage before the rotation. As a result, this configuration enables to increase the throughput (quantity of work).

It is of course preferred to measure the lock-voltages at a plural conditions that have different battery voltages before the rotation and temperatures, to produce a data table in which the battery voltage before the rotation, the temperatures and the respective lock-voltages (reference voltages) are associated with, and to store the data table in the control section 30. This configuration enables to use an optimum threshold value with regard to the temperature as well as the battery voltage.

The memory 32 is not limited to store the data table. For example, the memory 32 can be configured to store: a reference voltage (lock-voltage) at a certain temperature and/or at a certain battery voltage before the rotation; and an adjustment factor with regard to the temperatures and/or the battery voltages before the rotation. In this configuration, the control section 30 is configured to adjust (correct) the reference voltage stored in the memory 32 by use of an adjustment factor that is associated with the temperature at the time of using the tool and/of the battery voltage before the rotation, and to use the adjusted value as the threshold value for the detection of the motor-lock. The battery voltage before the rotation may be the remaining battery level.

Figure 7:
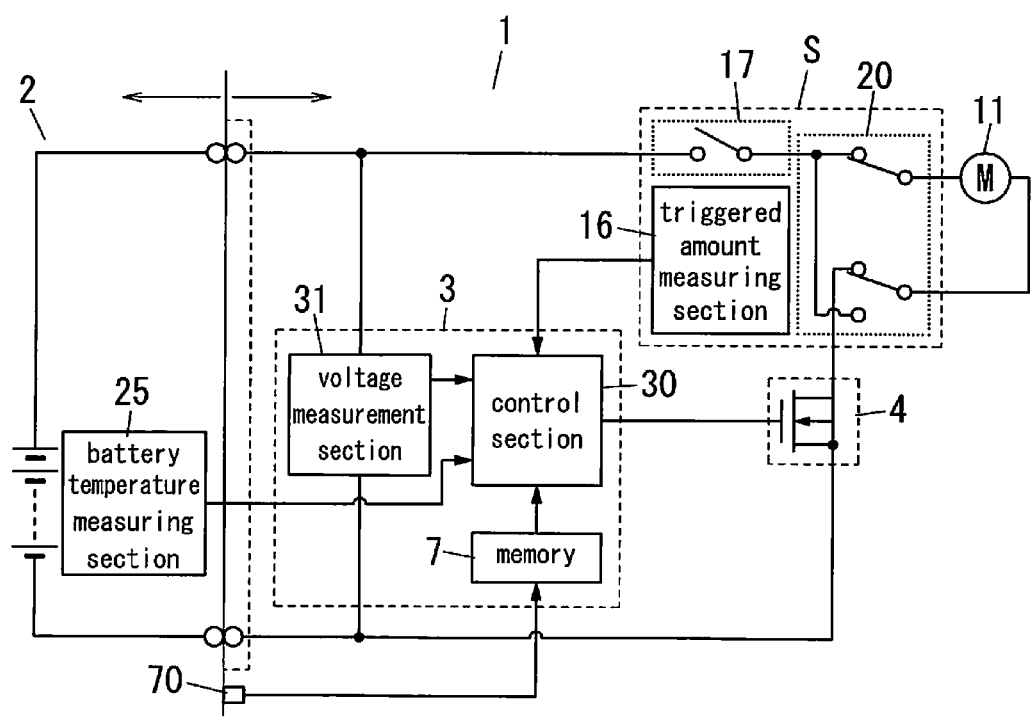
FIG. 7 is a block diagram of an electric tool according to another embodiment of the present invention.

As shown in FIG. 7, it is also preferred that the control circuit 3 includes a memory (storage means) 7, such as an EEPROM, that can be rewritten and can be accessed from outward. The reference voltage (lock-voltage) can be stored in the rewritable) memory 7. The control section 30 reads out the reference voltage (lock-voltage) stored in the memory 7 to determine the threshold value, and uses the threshold value for judging whether or not the motor is in a locked state.

The electric tool can include a connection section (rewriting means) 70 that is adapted to access from the outward to the memory 7, such as a terminal in conformity with RS232C standards. The content of the memory 7 can be rewritten through serial communication, when the memory 7 is connected to a personal computer via the connection section 70.

In using the electric tool, if the electric tool has a dispersion of the internal resistance of the battery pack 2 or the characteristics of the motor 11; or they have been caused a deterioration with time; or when the electric tool is used in an environment that the temperature is higher than the supposed maximum value for using the electric tool, the pre-stored threshold value may not be appropriate for judging the motor-lock. Even in such the situation, this configuration can modify the threshold value for judging the occurrence of the motor-lock to be appropriate for the current condition, by way of measuring the lock-voltage with using the current tool in the current environmental condition and then rewriting the obtained value onto the memory 7 as the reference value.

Figure 8:
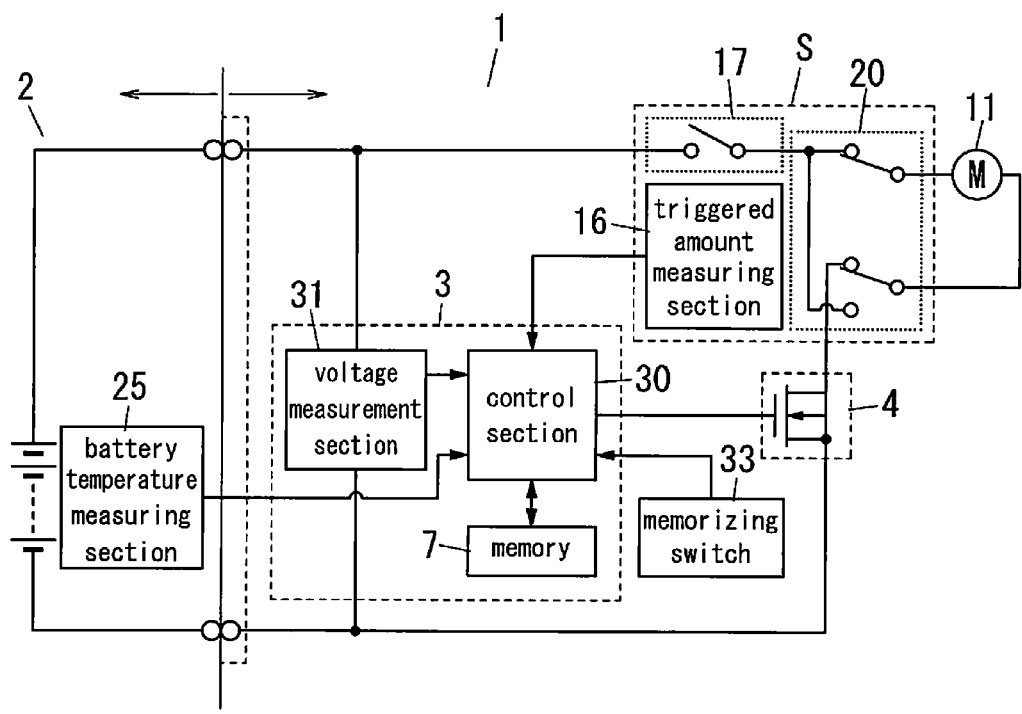
FIG. 8 is a block diagram of an electric tool according to yet another embodiment of the present invention.

FIG. 8 shows a yet another example of the embodiment. In this example, the electric tool is further provided with a memorizing switch (rewriting means) 33 that is connected to the control section 30. The control section 30 is configured to overwrite the voltage value of the battery voltage measured at that moment into the memory 7 when the memorizing switch 33 is pressed. After overwriting, the control section 30 uses the threshold value based on the modified (overwritten) reference voltage for judging the occurrence of the motor-lock.

The memorizing switch 33 is preferably provided at a casing surface (e.g. at a place pointed by an arrow in FIG. 2) of the electric tool 1. In the electric tool, it may occur that the control section 30 does not decide the occurrence of the motor-lock and continues the supply of electricity in spite of the occurrence of the motor-lock during the driving of the motor. In such a condition, if a user presses the memorizing switch 33, the voltage value of the battery voltage at that moment is written into the memory 7 as the lock-voltage (reference voltage). After that, when the motor is locked again, the control section 30 can reliably judge the occurrence of the motor-lock based on the rewritten (new) threshold value. With this configuration, the electric tool can be made appropriate for the situation without separately measuring the lock-voltage or connecting the personal computer for rewriting the voltage value.

As to the electric tool that is sensitive to a noise, it is preferred to measure the voltage values (e.g.) four times after pressing the memorizing switch 33, to obtain an average value of them, and to write the averaged value into the memory 7 as the reference voltage, instead of writing the value directly measured at the moment the memorizing switch 33 is pressed. This configuration enables to reduce the influence of the noise.

The electric tool that is powered by the battery pack 2 that includes a secondary battery of a lithium battery is generally configured to prevent the overdischarge. Note that, it is preferred that the threshold value used for the detection of the motor-lock is set higher than or equal to an overdischarge protection voltage (a voltage used for preventing the overdischarge). If the threshold value used for the motor-lock becomes lower than the overdischarge protection voltage, the overdischarge protection voltage is preferably used for the threshold value for the motor-lock.

The above described configurations can be combined.

The reference voltage is preferably memorized into the memory 32 (or memory 7) by performing a measurement step and a storage step at the time of the manufacturing the electric tool 1. The measurement step is a step of measuring a voltage value of the battery voltage when the motor 11 is in a locked state. The storage step is a step of memorizing on the memory 32 (or memory 7), as the reference voltage, the voltage value of the battery voltage when the motor 11 is in a locked state. In the storage step, the reference voltage may be written in the memory 32 (or memory 7) by means of a writing means (not shown in figure) or a rewriting means such as the abovedescribed memorizing switch 33.

The measurement step may includes a plurality of measurement steps. The plurality of measurement steps are performed using a plurality of electric tools that have the same configuration with the electric tool 1 of the present embodiment, and voltage values of the battery voltage (lock-voltage) when the motors are in locked states are obtained with regard to the plurality of electric tools. In the storage step, the reference voltage is determined based on the plurality of voltage values obtained with regard to the measurements about the plurality of electric tools, and the reference value is stored in the memory 32 (or memory 7).

For example, the maximum value of the lock-voltages obtained through the measurement with regard to the plurality of electric tools may be selected. In the storage step, this maximum value (or a value obtained by adding a certain value to the maximum value) may be stored in the memory 32 (or memory 7) as the reference voltage.

For example, an average value of the lock-voltages obtained through the measurement with regard to the plurality of electric tools may be selected. In the storage step, this average value (or a value obtained by adding a certain value to the average value) may be stored in the memory 32 (or memory 7) as the reference voltage.

The invention claimed is:

1. An electric tool powered by a secondary battery as a power source, comprising:
    an output section configured to be transmitted thereto a rotation of a motor directly or through a decelerator;
    a voltage measurement section configured to measure a battery voltage;
    a storage means configured to store, as a reference voltage, a voltage value of the battery voltage that has been measured preliminarily when a motor-lock is occurring;
    a control means configured to control a driving of said motor; and
    a temperature sensor for measuring a temperature,
    wherein said control means is configured to decide that said motor is in a locked state and then stop or decelerate said motor upon detecting that the battery voltage measured through said voltage measurement section is maintained lower than or equal to the reference voltage stored in said storage means for a predetermined period of time during the driving of said motor, and
    wherein said control means is configured to change the reference voltage that is compared with the battery voltage during the driving of said motor, on the basis of the temperature measured through said temperature sensor.

2. The electric tool as set forth in claim 1, wherein the reference voltage stored in said storage means is a voltage value of the battery voltage obtained at that time said motor is in a locked state under a condition where said secondary battery is fully charged.

3. The electric tool as set forth in claim 1, wherein said control means is configured to change the reference voltage that is compared with the battery voltage during the driving of said motor, on the basis of a battery level measured before said motor is driven.

4. The electric tool as set forth in claim 1, further comprising a rewriting means for rewriting the reference voltage stored in said storage means.

5. The electric tool as set forth in claim 1, wherein the reference voltage is set higher than or equal to a threshold value that is used for preventing an overdischarge of said power source.

6. A method for manufacturing an electric tool powered by a secondary battery as a power source,
    wherein said electric tool comprising: an output section configured to be transmitted thereto a rotation of a motor directly or through a decelerator; a voltage measurement section configured to measure a battery voltage; a storage means configured to store a reference voltage; and a control means configured to control a driving of said motor, wherein said control means is configured to decide that said motor is in a locked state and then stop or decelerate said motor upon detecting that the battery voltage measured through said voltage measurement section is maintained lower than or equal to the reference voltage stored in said storage means for a predetermined period of time during the driving of said motor, wherein the method comprises steps of:

a measurement step of measuring a voltage value of the battery voltage when said motor is in a locked state; and a storage step of memorizing on said storage means, as the reference voltage, said voltage value of the battery voltage measured when said motor is in the locked state.

7. The method for manufacturing an electric tool as set forth in claim 6, wherein said measurement step is performed under a condition where the environmental temperature is a maximum value within a temperature range supposed for using the electric tool.

8. The method for manufacturing an electric tool as set forth in claim 6, wherein said measurement step includes a plurality of measurement steps, said plurality of measurement steps being performed under conditions where environmental temperatures are different from one another, and wherein, in said storage step, voltage values of the battery voltage obtained in the plurality of measurement steps each are memorized in said storage means, as the reference voltage, in associated with the corresponding environmental temperature.

9. The method for manufacturing an electric tool as set forth in claim 6, wherein said measurement step is performed under a condition where said secondary battery is fully charged.

10. The method for manufacturing an electric tool as set forth in claim 6, wherein said measurement step includes a plurality of measurement steps, said plurality of measurement steps being performed under conditions where battery levels before the measurements are different from one another, and wherein, in said storage step, voltage values of the battery voltage obtained in the plurality of measurement steps each are memorized in said storage means, as said reference voltage, in associated with the corresponding battery level before the measurement.

11. The method for manufacturing an electric tool as set forth in claim 6, wherein said electric tool further comprises a rewriting means for rewriting the reference voltage stored in said storage means.

12. The method for manufacturing an electric tool as set forth in claim 6, wherein said measurement step includes a plurality of measurement steps, said plurality of measurement steps being performed using a plurality of electric tools that have the same configuration with one another, thereby obtaining the voltage values of the battery voltage when motors are in locked states with regard to said plurality of electric tools, and wherein, in said storage step, the reference voltage is determined based on the voltage values obtained with regard to said plurality of electric tools, and then is stored.

13. An electric tool powered by a secondary battery as a power source, comprising:

an output section configured to be transmitted thereto a rotation of a motor directly or through a decelerator;

a voltage measurement section configured to measure a battery voltage;

a storage means configured to store, as a reference voltage, a voltage value of the battery voltage that has been measured preliminarily when a motor-lock is occurring; and a control means configured to control a driving of said motor, wherein said control means is configured to decide that said motor is in a locked state and then stop or decelerate said motor upon detecting that the battery voltage measured through said voltage measurement section is maintained lower than or equal to the reference voltage stored in said storage means for a predetermined period of time during the driving of said motor, and wherein said control means is configured to change the reference voltage that is compared with the battery voltage during the driving of said motor, on the basis of a battery level measured before said motor is driven.

14. The electric tool as set forth in claim 13, wherein the reference voltage stored in said storage means is a voltage value of the battery voltage obtained at that time said motor is in a locked state under a condition where the environmental temperature is a maximum value within a temperature range supposed for using the electric tool.

15. The electric tool as set forth in claim 13, further comprising a temperature sensor for measuring a temperature, wherein said control means is configured to change the reference voltage that is compared with the battery voltage during the driving of said motor, on the basis of the temperature measured through said temperature sensor.

16. The electric tool as set forth in claim 13, further comprising a rewriting means for rewriting the reference voltage stored in said storage means.

17. The electric tool as set forth in claim 13, wherein the reference voltage is set higher than or equal to a threshold value that is used for preventing an overdischarge of said power source.

* * * * *